United States Patent
Li et al.

(10) Patent No.: US 9,729,400 B2
(45) Date of Patent: Aug. 8, 2017

(54) REALIZATION METHOD AND SYSTEM FOR ENABLING LLDP FUNCTION ON NON-ETHERNET LINK

(75) Inventors: Xuwen Li, Shenzhen (CN); Juanjuan Chen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/118,063

(22) PCT Filed: Feb. 10, 2012

(86) PCT No.: PCT/CN2012/071012
§ 371 (c)(1),
(2), (4) Date: Nov. 15, 2013

(87) PCT Pub. No.: WO2012/155549
PCT Pub. Date: Nov. 22, 2012

(65) Prior Publication Data
US 2014/0086099 A1    Mar. 27, 2014

(30) Foreign Application Priority Data
May 17, 2011    (CN) .......................... 2011 1 0127294

(51) Int. Cl.
*H04L 12/24*    (2006.01)
*H04L 29/08*    (2006.01)

(52) U.S. Cl.
CPC ............ *H04L 41/12* (2013.01); *H04L 69/324* (2013.01); *Y02B 60/43* (2013.01); *Y02B 60/44* (2013.01)

(58) Field of Classification Search
CPC ....... H04L 41/12; H04L 69/324; Y02B 60/44; Y02B 60/43
See application file for complete search history.

(56) References Cited

U.S. PATENT DOCUMENTS

2008/0101240 A1* 5/2008 Rohilla et al. ................ 370/236
2008/0267080 A1* 10/2008 Sultan et al. ................. 370/248
(Continued)

FOREIGN PATENT DOCUMENTS

| CN | 101227336 A | 7/2008 |
|---|---|---|
| CN | 101304333 A | 11/2008 |

(Continued)

OTHER PUBLICATIONS

Supplementary European Search Report in European application No. 12786073.2, mailed on Oct. 21, 2014. (5 pages—see entire document).

(Continued)

*Primary Examiner* — Christopher Grey
(74) *Attorney, Agent, or Firm* — Oppedahl Patent Law Firm LLC

(57) ABSTRACT

The disclosure provides a realization method for enabling a Link Layer Discovery Protocol (LLDP) function on a non-Ethernet link, which includes: starting LLDP global enabling on a network device at an end and a network device at an opposite end respectively; starting LLDP port enabling on a non-Ethernet interface of the network device at the end and a non-Ethernet interface of the network device at the opposite end respectively. The disclosure further provides a realization system for enabling an LLDP function on a non-Ethernet link, correspondingly. The disclosure extends and improves the physical interface scope supported by an LLDP, and achieves the purpose of enabling the LLDP neighbor discovery function on the non-Ethernet link such as a POS interface by means of supporting usage of the LLDP on the interface such as the POS interface.

6 Claims, 5 Drawing Sheets

(56) References Cited

U.S. PATENT DOCUMENTS

2008/0270588 A1    10/2008  Sultan et al.
2008/0291922 A1*   11/2008  Sultan et al. ............ 370/395.53
2011/0103257 A1*    5/2011  Claise ..................... H04L 45/02
                                                           370/254

FOREIGN PATENT DOCUMENTS

| CN | 101345655 A  | 1/2009  |
|----|--------------|---------|
| CN | 101369933 A  | 2/2009  |
| CN | 101388835 A  | 3/2009  |
| CN | 101414963 A  | 4/2009  |
| CN | 102223278 A  | 10/2011 |
| WO | 2004032562 A1| 4/2004  |

OTHER PUBLICATIONS

International Search Report in international application No. PCT/CN2012/071012, mailed on May 17, 2012. (4 pages—see entire document).
English Translation of the Written Opinion of the International Search Authority in international application No. PCT/CN2012/071012, mailed on May 17, 2012. (8 pages—see entire document).
Zeng; Gan, Physical Network Topology Discovery Based on Link Layer Discovery Protocol (LLDP), Computer Knowledge and Technology, Jul. 2006, No. 20. (4 pages—see International Search Report in international application No. PCT/CN2012/071012 for relevant pages).
LLDP Used in Ethernet device, mailed on Dec. 31, 2010.

\* cited by examiner

REALIZATION METHOD AND SYSTEM FOR ENABLING LLDP FUNCTION ON NON-ETHERNET LINK

TECHNICAL FIELD

The disclosure relates to the field of data communications, in particular to a realization method and system for enabling a Link Layer Discovery Protocol (LLDP) function on a non-Ethernet link.

BACKGROUND

With the wide application of Ethernet techniques in a Local Area Network (LAN) and a Metropolitan Area Network (MAN), kinds of network devices are growing and configurations thereof are complex, and users have higher requirements for Ethernet management capacities. At present, an auto discovery function is used in many network management systems to track changes of topology. However, this function can only analyze a topological structure of a network layer. Information, such as which interfaces are provided by a device, which interfaces are connected to other devices, and paths between clients, network devices and respective servers, is obtained by a link layer. The user has to obtain enough detailed information to pinpoint network failures. Meanwhile, a standard information communication platform is needed, so that devices from different operators are able to discover each other in the network and to exchange their system and configuration information. An LLDP function is proposed under such background.

The LLDP is a kind of link layer discovery protocol defined in an Institute of Electrical and Electronic Engineers (IEEE 802.1AB) protocol and provides a standard link Layer discovery manner, through which a device may package information (such as a device identification, a interface identification, a main function, a management address of the device at one end) into various Type/Length/Value (TLV), and sends them to neighbours directly connected with the device by encapsulating them into Link Layer Discovery Protocol Data Unit (LLOPDU); the neighbours stores the received LLOPDU information and display them to users in a Command Line Interface (CLI) manner or in a standard Management Information Base (MIB) form. The network management system may quickly learn topology of layer-2 and changes of the topology through this protocol, so as to query both connection paths between the network management system and neighbour devices in the network and physical information such as device models of these neighbour devices, in order to help the network manager to know the network topology, so that the network manager may perform a network management system query, a network statistics, and diagnosis of link communication state based on the network topology.

Packet Over SONET/SDH (POS) interfaces will be described hereinafter.

A Synchronous Optical Network (SONET) is a synchronous transmission technology defined by an American National Standards Institute (ANSI), and is a standard transport protocol of globalization by using optical transmission.

A Synchronous Digital Hierarchy (SDH) is defined by a International Telephone and Telegraph Consultative Committee (CCITT) (which is also called International Telegraph Union Telecommunication Standardization Sector (ITU-T) at present), and uses a synchronous multiplexing manner and a flexible mapping structure to directly add-drop low-speed branch signals from SDH signals without a plurality of multiple connection/tapping equipments, so that loss of signal and equipment investment may be reduced.

The POS interface is used in both the MAN and the WAN, and has an advantage of supporting packet data, such as IP data packets.

The POS interface directly maps variable-length data packets to SONET synchronous payload, uses physical layer transmission standard of the SONET, and provides a high-speed, reliable and point to point data connection.

The POS interface may use a Point to Point Protocol (PPP), frame relay and a High-Level Data Link Control (HDLC) protocol in the data link layer, and may use an IP protocol in the network layer. Transmission speed of interfaces may be different for different devices, for example, each level of STM-1, STM-4 and STM-16 has 4 times speed of the next lower level.

Physical parameters of the POS interface needs to be configured according to configuration or application of a network device at an opposite end, before configuring the link protocol and the network protocol.

A Universal Logic Ether Interface (ULEI) will be described hereinafter.

The ULEI is a logic interface with Ethernet nature. The ULEI has a physical Ethernet interface attribute, and basically supports all Ethernet services including a sub-interface, a Virtual Local Area Network (VLAN), QINQ, L2VPN, L3VPN, routing, Bidirectional Forwarding Detection (BFD), Multiple Spanning Tree Protocol (MSTP) and the like. The purpose of the ULEI is as follows.

(1) VPN bridging between a second layer and a third layer, i.e., to bridge the second layer VPN to the third layer VPN in one device.

(2) A common logical Ethernet interface designed to implement Ethernet services (such as bridging an ETH service including extended supported FR, ATM) via a non-Ethernet interface; the ULEI is used to shield differences among a plurality of different interfaces so that physical interfaces cannot be felt during service process.

Additionally, a bridging ULEI must be provided on an ETH interface board; a heterogeneous ULEI must be provided on a POS interface plate; ULEIs having a binding bridging relationship must be provided on a same line card.

The LLDP only defines achievement of the LLDP function on the Ethernet, and a conventional protocol standard does not relate to how to enable the LLDP function on a non-Ethernet link WAN such as a POS interface, and does not regularly define that interfaces such as the POS interface are able to support an LLDP neighbour discovery function.

SUMMARY

To solve the above technical problem in the related art, the disclosure provides a realization method and system for enabling an LLDP function on a non-Ethernet link, to enable the LLDP function on a non-Ethernet link WAN such as a POS interface.

To solve the above technical problems, one aspect of the disclosure is to provide a realization method for enabling an LLDP function on a non-Ethernet link, which includes: starting LLDP global enabling on a network device at an end and a network device at an opposite end respectively; starting LLDP port enabling on a non-Ethernet interface of the network device at the end and a non-Ethernet interface of the network device at the opposite end respectively.

Furthermore, the non-Ethernet interface may be a Packet Over SONET/SDH (POS) interface, a High-Level Data Link Control (HDLC) interface, a Frame Relay (FR) interface, or an Asynchronous Transfer Mode (ATM) interface.

Furthermore, the method may further include: packaging an LLDP hello message at a port of the network device at the end when an interval time for sending a packet hello time of an LLDP is reached; sending the LLDP hello message to the network device at the opposite end; receiving, by the network device at the end, an LLDP hello message from the network device at the opposite end; and processing the LLDP hello message according to the LLDP to generate or update neighbour information.

Furthermore, the method may further include: binding a Universal Logic Ether Interface (ULEI) up with the non-Ethernet interface of the network device at the end and the non-Ethernet interface of the network device at the opposite end respectively.

Furthermore, the method may further include: driving, by a timer, a sending state machine at a port to package an LLDP hello message when a set hello time is reached; if the port is the non-Ethernet interface, querying the ULEI bound up with the non-Ethernet interface; if the ULEI bound up with the non-Ethernet interface is not found, discarding the message; if the ULEI bound up with the non-Ethernet interface is found, replacing the non-Ethernet interface with the ULEI; encapsulating the LLDP hello message, and sending the encapsulated LLDP hello message to a rack at the opposite end via a microcode.

Furthermore, the method may further include: receiving, by a microcode of a rack at the end, the LLDP hello message from the rack at the opposite end; if the port which received the LLDP hello message is a ULEI, querying the non-Ethernet interface bound up with the ULEI; if the non-Ethernet interface bound up with the ULEI is not found, discarding the message; if the non-Ethernet interface bound up with the ULEI is found, replacing the ULEI with the non-Ethernet interface; analyzing the received LLDP hello message; generating or updating the neighbour information.

Another aspect of the disclosure is to provide a realization system for enabling an LLDP function on a non-Ethernet link, which includes: a global enabling starting module and a port enable starting module, wherein: the global enabling starting module is configured to start LLDP global enabling on a network device at an end and a network device at an opposite end respectively; the port enable starting module is configured to start LLDP port enabling on a non-Ethernet interface of the network device at the end and a non-Ethernet interface of the network device at the opposite end respectively.

Furthermore, the system may further include an interface binding module, which is configured to bind a Universal Logic Ether Interface (ULEI) up with the non-Ethernet interface of the network device at the end and the non-Ethernet interface of the network device at the opposite end respectively.

Furthermore, the system may further include a message sending module and a message receiving module, wherein: the message sending module is configured to package an LLDP hello message at a port of the network device at the end when an interval time for sending a packet hello time of an LLDP is reached, and to send the LLDP hello message to the network device at the opposite end; the message receiving module is configured to receive an LLDP hello message on the network device at the end from the network device at the opposite end, and to process the LLDP hello message according to the LLDP to generate or update neighbour information.

Furthermore, the system may further include an aging module, which is configured to periodically cause the LLDP neighbour information, which is not updated before timeout, to age.

Based on the LLDP, the disclosure provides the realization method and system for enabling the LLDP function on the non-Ethernet link, which can extend and improve the physical interface scope supported by the LLDP, and achieve the purpose of enabling a LLDP neighbour discovery function on the non-Ethernet link such as a POS interface by means of supporting usage of the LLDP on the interface such as the POS interface. Moreover, the solutions of the disclosure have advantages of simple implementation and low cost.

DETAILED DESCRIPTION

To make purposes, solutions, and advantages of the disclosure clearer, embodiments will be described in detail with reference to the drawings. It should be noted that embodiments and features thereof in the disclosure may be combined with each other if not conflicting.

It should be noted that solutions of the disclosure may be used to enable an LLDP function on a non-Ethernet link WAN such as POS, High-Level Data Link Control (HDLC), Frame Relay (FR) and Asynchronous Transfer Mode (ATM) interfaces. Hereinafter, embodiments will be described by taking the POS interface as an example.

Figure 1:
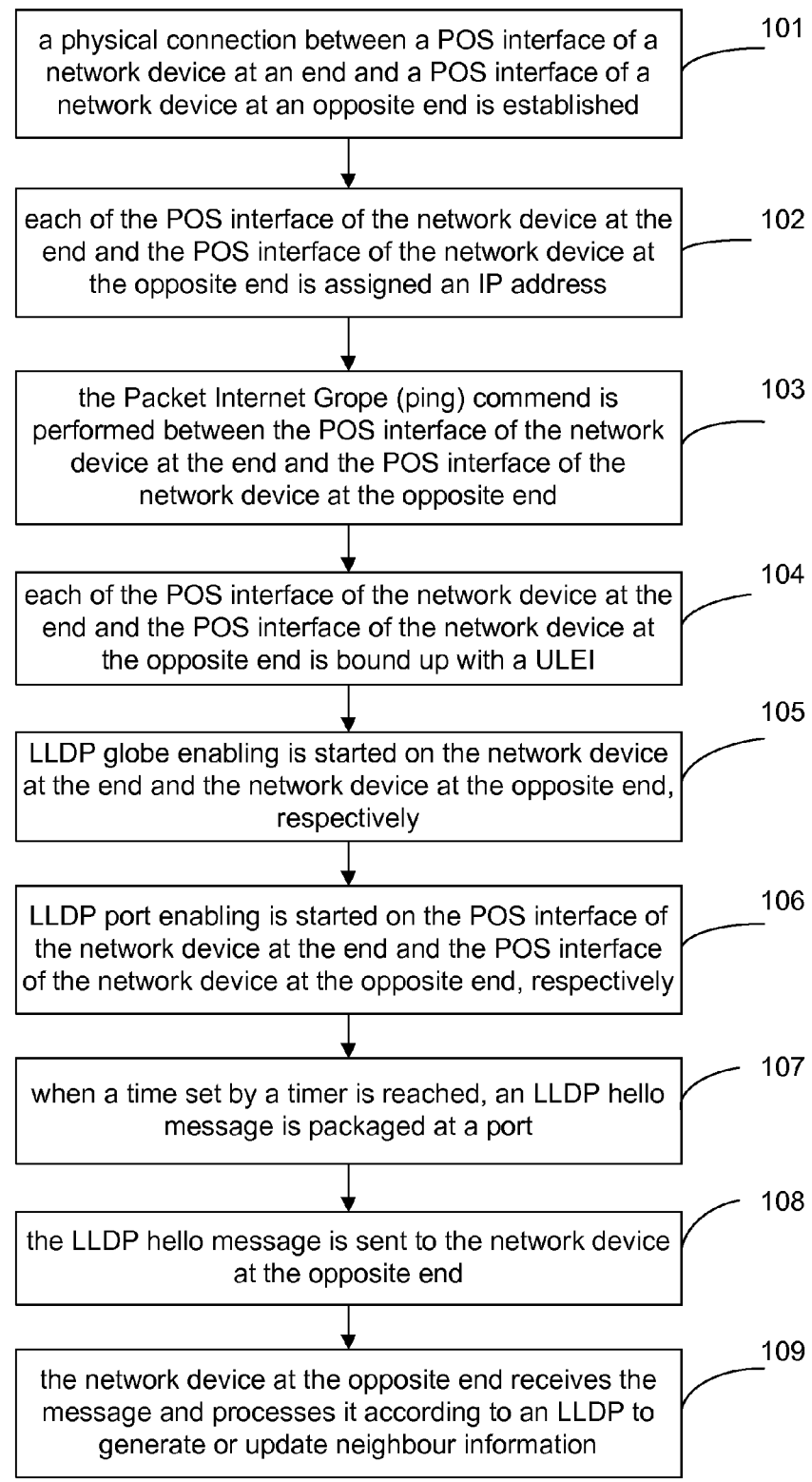
FIG. 1 is a flowchart of a realization method according to an embodiment of the disclosure.

FIG. 1 is a flowchart of a realization method according to an embodiment of the disclosure. As shown in FIG. 1, the method includes the following steps.

Step 101: a physical connection between a POS interface of a network device at an end and a POS interface of a network device at an opposite end is established. In this embodiment, the physical connection is established through optical fibres.

Step 102: each of the POS interface of the network device at the end and the POS interface of the network device at the opposite end is assigned an IP address.

Step 103: it is determined that the physical link is connected between the POS interface of the network device at the end and the POS interface of the network device at the opposite end through a Packet Internet Grope (ping) command.

Step 104: each of the POS interface of the network device at the end and the POS interface of the network device at the opposite end is bound up with a ULEI.

This step may be omitted. The purpose of this step is to take full advantage of conventional ULEI technology and improve efficiency of packet transmission through conversion of interfaces.

Step 105: LLDP globe enabling is started on the network device at the end and the network device at the opposite end, respectively.

Step 106: LLDP port enabling is started on the POS interface of the network device at the end and the POS interface of the network device at the opposite end, respectively.

Step 107: when hello time set by a timer is reached, an LLDP hello message is, by the network device at the end, packaged at the POS interface of the network device at the end (including an Ethernet interface and a non-Ethernet interface).

Specifically, the timer is used, according to the preset hello time, to drive a sending state machine at the network device's port to package the LLDP hello message.

Step 108: the network device at the end sends the LLDP hello message to the network device at the opposite end.

Step 109: the network device at the opposite end receives the message and processes it according to an LLDP to generate or update neighbour information.

The above steps 107 to 109 describe that the network device at the end sends the LLDP hello message to the network device at the opposite end. Similarly, when hello time set by a timer is reached, an LLDP hello message may also be packaged by the network device at the opposite end at a port thereof, and be sent to the network device at the end; the network device at the end processes the received LLDP hello message according to the LLDP to generate or update neighbour information.

In this embodiment, necessary configuration parameters and performance parameters for networking performance are configured according to a Management Information Base (MIB) of Operation Administration and Maintenance (OAM) or a Simple Network Management Protocol (SNMP), and this configuration may be displayed, in which the configured parameters mainly include:

IP addresses respectively assigned to a non-Ethernet interface of the network device at the end and a non-Ethernet interface of the network device at the opposite end;

global LLDP function enabling or disabling of network devices;

interval time for global LLDP sending packet of network devices;

holding time for global LLDP neighbours of network devices;

the maximum number of global LLDP neighbours of network devices;

LLDP function enabling or disabling of POS interfaces of network devices; and the maximum number of LLDP neighbours of POS interfaces of network devices.

Figure 2:
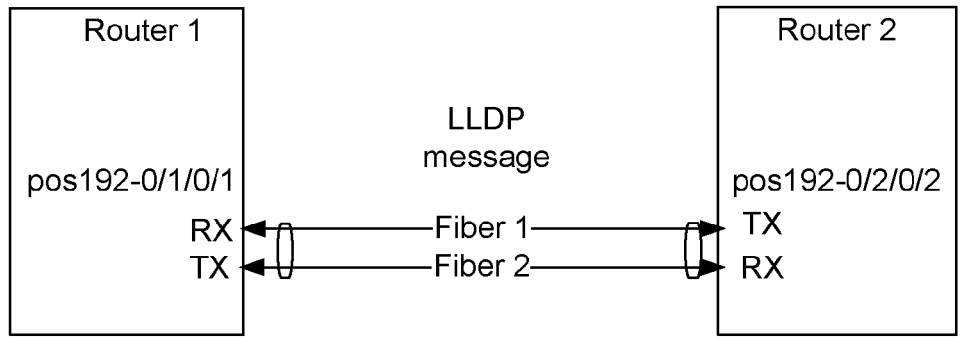
FIG. 2 is a networking diagram of a realization method according to an embodiment of the disclosure.

FIG. 2 is a networking diagram of a realization method according to an embodiment of the disclosure. In FIG. 2, RX and TX respectively indicate receiving and transmitting. As shown in FIG. 2, pos192-0/1/0/1 in router 1 is connected with pos192-0/2/0/2 in router 2. Messages are transmitted between the router 1 and the router 2 through optical fibres. The router 1 and the router 2 generate neighbour information respectively.

Figure 3:
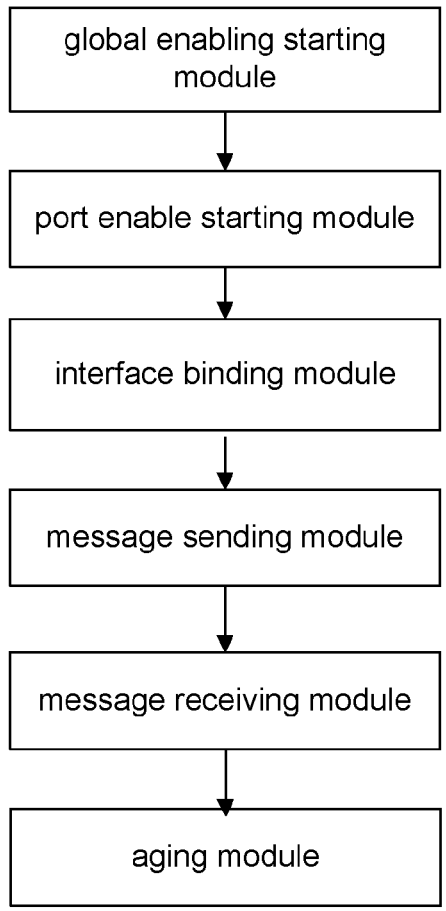
FIG. 3 is a structural diagram of a realization system according to an embodiment of the disclosure.

FIG. 3 is a structural diagram of a realization system according to an embodiment of the disclosure. As shown in FIG. 3, the system for enabling an LLDP function on a non-Ethernet link includes: a global enabling starting module, a port enabling starting module, an interface binding module, a message sending module, a message receiving module and an aging module.

The global enabling starting module is configured to respectively start LLDP global enabling on a network device at an end and a network device at an opposite end.

The port enabling starting module is configured to respectively start LLDP port enabling on a non-Ethernet interface of the network device at the end and a non-Ethernet interface of the network device at the opposite end.

The interface binding module is configured to bind an ULEI up with the non-Ethernet interface of the network device at the end and the non-Ethernet interface of the network device at the opposite end, respectively.

The message sending module is configured to package an LLDP hello message on a port of the network device at the end when hello time set by a timer is reached, and to send the LLDP hello message to the network device at the opposite end. Specifically, the timer is used, according to the preset hello time, to drive a sending state machine at the network device's port to package the LLDP hello message.

The message receiving module is configured to receive the LLDP hello message from the network device at the opposite end on the network device at the end, and to process the LLDP hello message according to an LLDP to generate or update neighbour information.

The aging module is configured to periodically cause the LLDP neighbour information, which is not updated before timeout, to age.

Specifically, the aging module is configured to traverse the LLDP neighbour information in a polling manner when the time set by an aging timer times out; and to delete the LLDP neighbour information which has timed out, when aging time of the LLDP neighbour information times out.

Solutions of the disclosure enable the LLDP function on the non-Ethernet link such as a POS interface of a network device in a Command Line (CML) manner.

Certainly, the above "an/the end" and "an/the opposite end" are relative concepts, if one side indicates "an/the end", the other side will indicates "an/the opposite end".

Figure 4:
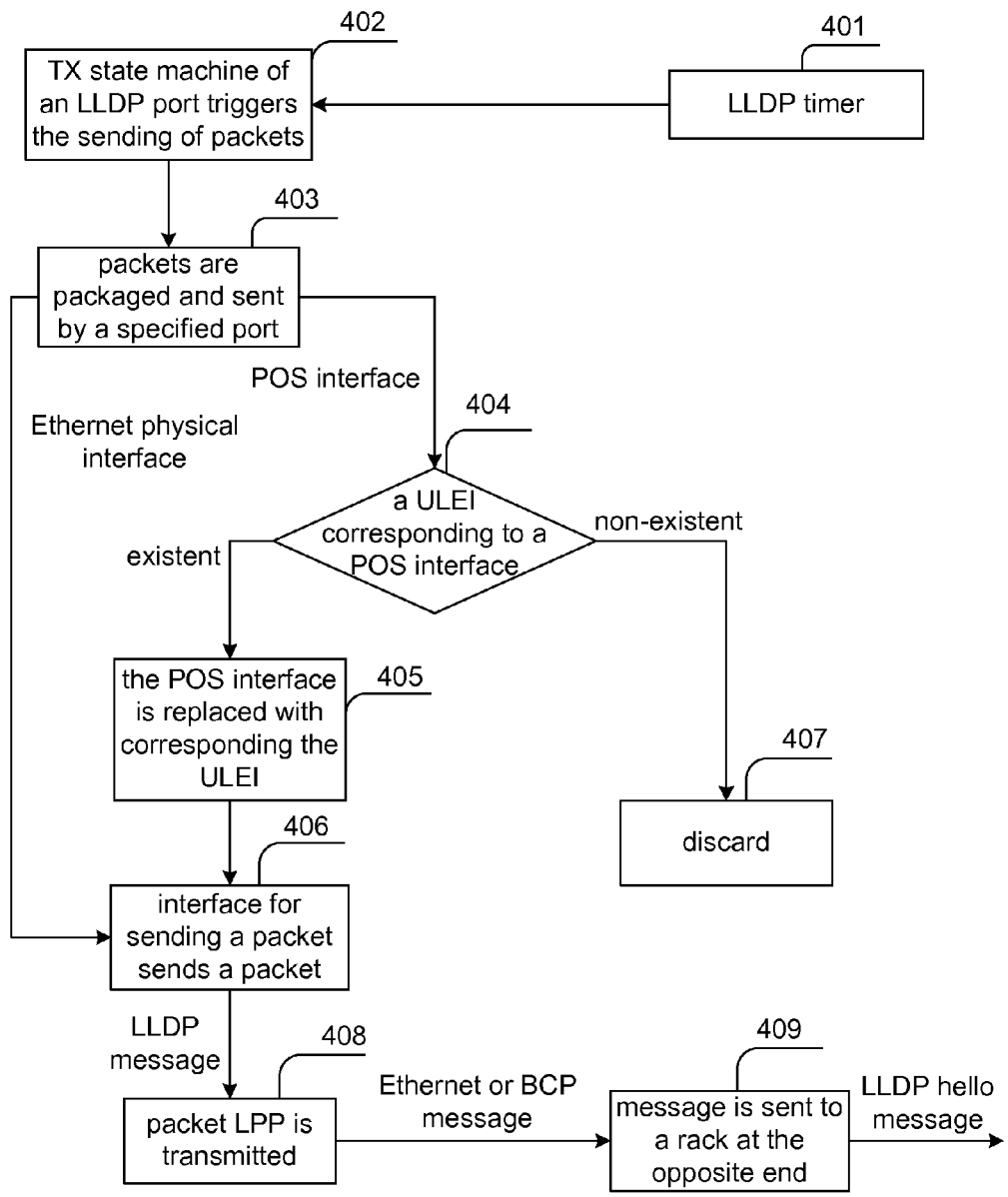
FIG. 4 is a flowchart of sending a packet by using the disclosure.

FIG. 4 is a flowchart for sending a packet by using the disclosure. As shown in FIG. 4, the process of sending a packet includes the following steps.

Step 401: a timer runs up to preset hello time.

Step 402: the timer drives a sending state machine at a port (i.e., a TX state machine at an LLDP port) to package an LLDP hello message.

Step 403: after packaging the LLDP hello message, it is determined that the port is an Ethernet physical port or a non-Ethernet interface such as a POS interface before sending the message, since the LLDP hello message needs to be sent by a specified port; if the port is the Ethernet physical port, step 406 is executed; if the port is the non-Ethernet interface such as the POS interface, step 404 is executed.

Step 404: different operations are performed based on whether or not the non-Ethernet interface such as the POS interface is bound up with the ULEI; if the non-Ethernet interface such as the POS interface is bound up with the ULEI, step 405 is executed; if the non-Ethernet interface such as the POS interface is not bound up with the ULEI, step 407 is executed.

Step 405: if the ULEI bound up with the non-Ethernet interface such as the POS interface is found, the non-Ethernet interface such as the POS interface is replaced with the ULEI.

Step 406: a packet is sent via a packet transmitting interface, and step 408 is executed.

Step 407: if the ULEI bound up with the non-Ethernet interface such as the POS interface is not found, the message is discarded, and the process ends.

Figure 6:
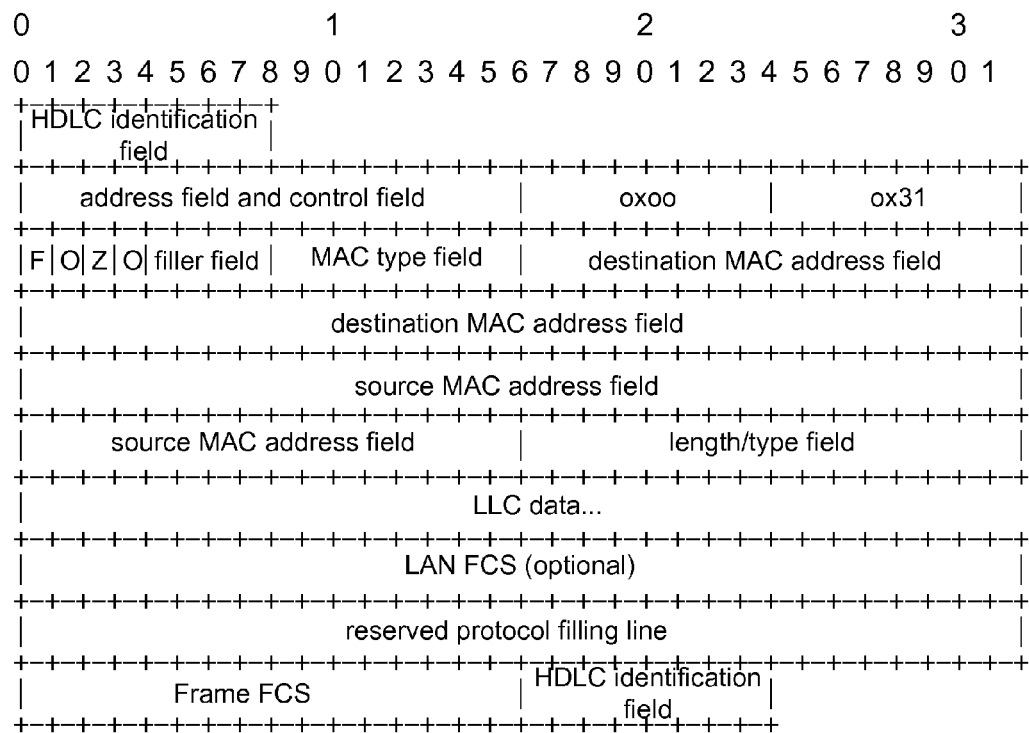
FIG. 6 is a structural diagram of message encapsulation by using the disclosure.

Step 408: a packet receiving and transmitting module (i.e., packet receiving and transmitting LPP) defined in the LLDP receives an LLDP Ethernet message; if it is needed for the non-Ethernet interface such as the POS interface to encapsulate the packet as a PPP Bridging Control Protocol (BCP) message defined in an IEEE 802.3/Ethernet protocol; the encapsulating manner is shown in FIG. 6.

Step 409: the message is sent to a rack at an opposite end.

Figure 5:
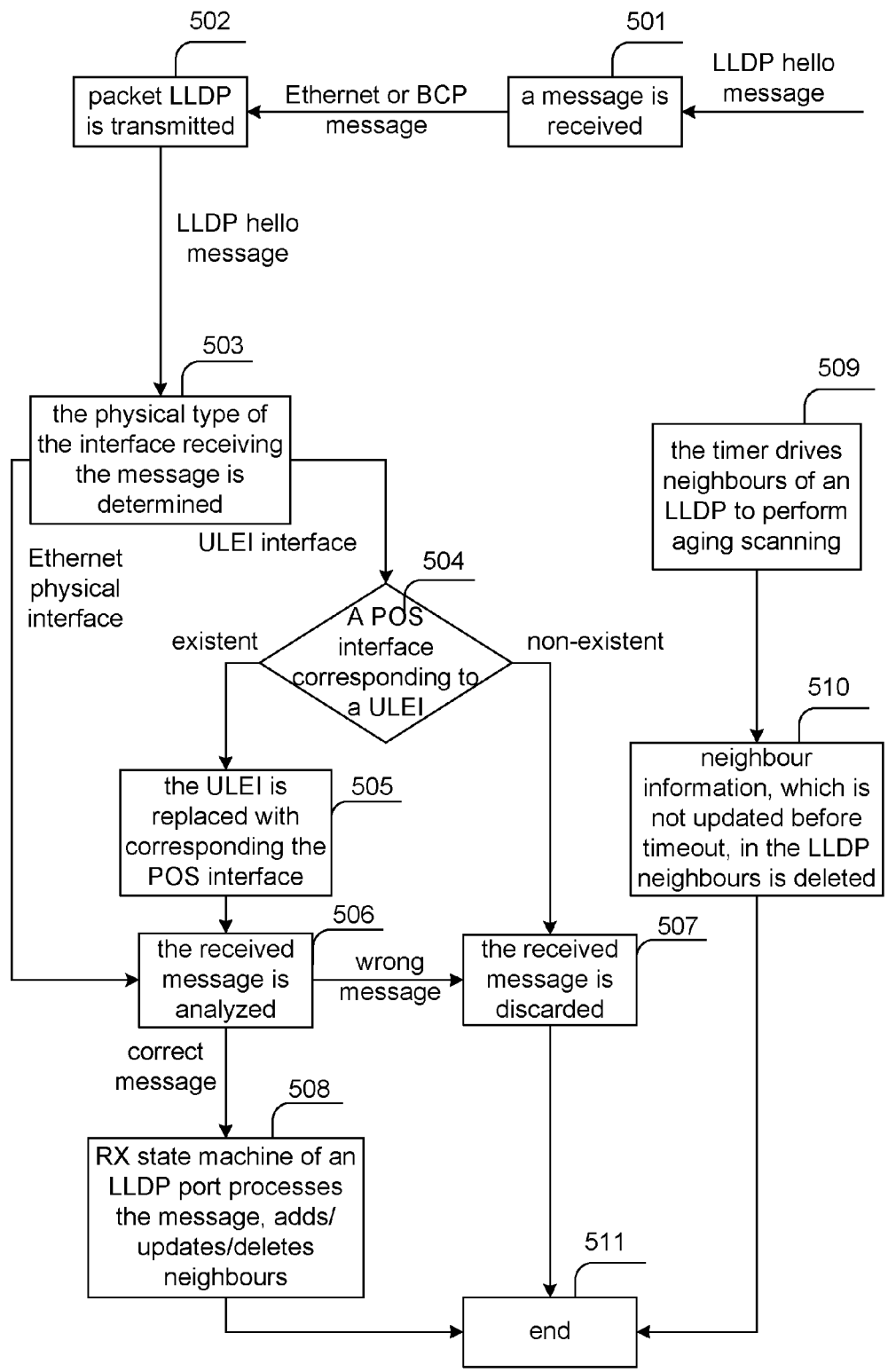
FIG. 5 is a flowchart of receiving a packet by using the disclosure.

FIG. 5 is a flowchart of receiving a packet by using the disclosure. As shown in FIG. 5, the process of receiving a packet includes the following steps.

Step 501: a rack at an end receives an LLDP hello message from a rack at an opposite end, determines that the message is a BCP message defined in an IEEE 802. 3/Ethernet protocol, and determines that the message is an LLDP hello message according to a target Media Access Control (MAC) in the message, then removes the encapsulation of the BCP message and uploads the message to a packet receiving and transmitting module defined in an LLDP from a ULEI, in which the message is in the form of Ethernet. If an interface BCP negotiation state is focused in original heterogeneous process, it needs to be skipped specifically. The BCP negotiation is not focused when the LLDP hello message is uploaded, the LLDP hello message is uploaded due to interface protocol UP. The protocol UP may be successful IPCP negotiation and is not necessarily successful BCP negotiation. The protocol UP may be any successful negotiation and switch is not needed.

Step 502: after the packet receiving and transmitting module defined in the LLDP receives the LLDP Ethernet message, information including ULEI is distributed to an LLDP service module defined in the LLDP.

Step 503: it is determined that the physical type of an interface receiving the message is an Ethernet physical interface, and then step 506 is executed; it is determined that the physical type of an interface receiving the message is a ULEI, and then step 504 is executed.

Step 504: a non-Ethernet interface such as a POS interface bound up with the ULEI is queried and found, and then step 505 is executed; otherwise, step 507 is executed.

Step 505: if the non-Ethernet interface such as the POS interface bound up with the ULEI is found, the ULEI is replaced with the non-Ethernet interface such as the POS interface.

Step 506: the LLDP service module analyzes the received LLDP hello message, if there are errors in the received LLDP hello message, step 507 is executed; otherwise step 508 is executed.

Step 507: if the non-Ethernet interface such as the POS interface bound up with the ULEI is not found, or if there are errors in the received LLDP hello message, the message is discarded, and the process ends.

Step 508: a receiving state machine (i. e., an RX state machine at an LLDP port) is driven through the message received via the port so as to add, update or delete LLDP neighbour information, and the process ends.

Step 509: a timer drives neighbour aging scanning of the LLDP.

Step 510: neighbour information, which is not updated before timeout, of LLDP neighbours is deleted.

Step 511: the process ends.

The above embodiments by taking the non-Ethernet interface such as the POS interface bound up with the ULIE interface as an example. If the non-Ethernet interface such as the POS interface is not bound up with the ULIE, the network device at the end may directly analyze the LLDP message received from the network device at the opposite end.

FIG. 6 is a structural diagram of message encapsulation by using the disclosure. The message format of LLDP encapsulated by a BCP message is shown in FIG. 6. 802.3 Frame in RFC 2878 is reused, options which should be specified are as follows.

Address and Control, this field is filled with 0XFF03;

PPP Protocol, this field is filled with 0x0031;

If F bit in Flags does not indicate LAN fragment, this field is filled with 0;

Z bit in Flags is filled with 0;

Pads, this field is filled with 0;

MAC Type should follow IEEE 802.3/Ethernet, this field is filled with 1; and

Optional Data Link Layer Padding, this field is omitted in the message.

The above embodiments are described by taking the POS interface as an example. Method for enabling LLDP function on other non-Ethernet interface such as HDLC, FR and ATM can be determined by the analysis, which will not be further elaborated.

In view of the above, the disclosure provides a method for enabling LLDP function on non-Ethernet link such as the POS interface based on LLDP, extends and improves the physical interface scope supported by LLDP, and achieves the purpose of enabling LLDP neighbour discovery function on non-Ethernet link such as POS be means of supporting usage of LLDP on interface such as POS.

The person skilled in the art should appreciate that a part or all of the steps in the above method may be achieved through related hardware instructed by a program. The program may be stored in a computer readable storage medium, such as ROM, disk or CD. Optionally, a part or all of the steps in the above embodiments may be achieved by one or more integrated circuit. Accordingly, each module/unit in the above embodiments may be achieved in the form of hardware or software function modules. The disclosure is not limited to any specific form of combination of hardware and software.

Certainly, the disclosure may have wide variety of possible embodiments. The person skilled in the art may make changes or modifications on the disclosure without departure of spirit and protection scope of the disclosure, these changes or modifications still fall into the protection scope of the appended claims.

The invention claimed is:

1. A realization method for enabling a Link Layer Discovery Protocol (LLDP) function on a non-Ethernet link, comprising:

binding a Universal Logic Ether Interface (ULEI) up with a non-Ethernet interface of a network device at an end and a non-Ethernet interface of a network device at an opposite end respectively;

starting LLDP global enabling on the network device at the end and the network device at the opposite end respectively;

starting LLDP port enabling on the non-Ethernet interface of the network device at the end and the non-Ethernet interface of the network device at the opposite end respectively;

packaging an LLDP hello message at the ULEI of the network device at the end when an interval time for sending a packet hello time of an LLDP is reached;

sending the LLDP hello message over the non-Ethernet link to the network device at the opposite end;

receiving, at the ULEI of the network device at the end, an LLDP hello message transmitted over the non-Ethernet link from the network device at the opposite end; and processing the LLDP hello message according to the LLDP to generate or update neighbour information.

2. The method according to claim 1, wherein the non-Ethernet interface is a Packet Over SONET/SDH (POS) interface, a High-Level Data Link Control (HDLC) interface, a Frame Relay (FR) interface, or an Asynchronous Transfer Mode (ATM) interface.

3. The method according to claim 1, further comprising:
driving, by a timer, a sending state machine at a port to package an LLDP hello message when a set hello time is reached;
if the port is the non-Ethernet interface, querying the ULEI bound up with the non-Ethernet interface; if the ULEI bound up with the non-Ethernet interface is not found, discarding the message; if the ULEI bound up with the non-Ethernet interface is found, replacing the non-Ethernet interface with the ULEI;
encapsulating the LLDP hello message, and sending the encapsulated LLDP hello message to a rack at the opposite end via a microcode.

4. The method according to claim 3, further comprising:
receiving, by a microcode of a rack at the end, the LLDP hello message from the rack at the opposite end;
if the port which received the LLDP hello message is a ULEI, querying the non-Ethernet interface bound up with the ULEI; if the non-Ethernet interface bound up with the ULEI is not found, discarding the message; if the non-Ethernet interface bound up with the ULEI is found, replacing the ULEI with the non-Ethernet interface;
analyzing the received LLDP hello message;
generating or updating the neighbour information.

5. A realization system for enabling a Link Layer Discovery Protocol (LLDP) function on a non-Ethernet link, comprising a global enabling starting module and a port enable starting module, wherein:
the global enabling starting module is configured to start LLDP global enabling on a network device at an end and a network device at an opposite end respectively;
the port enable starting module is configured to start LLDP port enabling on a non-Ethernet interface of the network device at the end and a non-Ethernet interface of the network device at the opposite end respectively;
an interface binding module, which is configured to bind a Universal Logic Ether Interface (ULEI) up with the non-Ethernet interface of the network device at the end and the non-Ethernet interface of the network device at the opposite end respectively;
a message sending module, which is configured to package an LLDP hello message at the ULEI of the network device at the end when an interval time for sending a packet hello time of an LLDP is reached, and to send the LLDP hello message over the non-Ethernet link to the network device at the opposite end;
a message receiving module, which is configured, at the ULEI of the network device at the end, to receive an LLDP hello message transmitted over the non-Ethernet link from the network device at the opposite end, and to process the LLDP hello message according to the LLDP to generate or update neighbour information.

6. The system according to claim 5, further comprising an aging module, which is configured to periodically cause the LLDP neighbour information, which is not updated before timeout, to age.

* * * * *